US008899921B2

(12) United States Patent
McCune

(10) Patent No.: US 8,899,921 B2
(45) Date of Patent: Dec. 2, 2014

(54) WIND TURBINE HAVING FLOW-ALIGNED BLADES

(76) Inventor: Earl McCune, Santa Clara, CA (US)

( * ) Notice: Subject to any disclaimer, the term of this patent is extended or adjusted under 35 U.S.C. 154(b) by 320 days.

(21) Appl. No.: 13/267,296

(22) Filed: Oct. 6, 2011

(65) Prior Publication Data

US 2013/0028733 A1    Jan. 31, 2013

Related U.S. Application Data

(60) Provisional application No. 61/391,198, filed on Oct. 8, 2010.

(51) Int. Cl.
*F03D 7/02* (2006.01)
*F03D 1/06* (2006.01)
*F03D 11/04* (2006.01)

(52) U.S. Cl.
CPC ............ *F03D 7/0236* (2013.01); *F03D 1/0616* (2013.01); *F03D 1/0625* (2013.01); *F03D 1/0633* (2013.01); *F05B 2240/313* (2013.01); *Y02E 10/721* (2013.01); *Y02E 10/723* (2013.01)
USPC ........ 416/1; 416/30; 416/41; 416/61; 416/89; 416/153; 416/170 R; 415/1; 415/4.1

(58) Field of Classification Search
USPC ............ 415/1, 4.1; 416/1, 27, 30, 37, 40, 41, 416/46, 61, 87–89, 132 R, 132 B, 136, 141, 416/153, 170 R
See application file for complete search history.

(56) References Cited

U.S. PATENT DOCUMENTS

| 2,622,686 | A  | * | 12/1952 | Chevreau et al. | 416/23 |
|---|---|---|---|---|---|
| 3,846,042 | A  | * | 11/1974 | Keene | 416/110 |
| 4,430,044 | A  | * | 2/1984 | Liljegren | 416/119 |
| 6,726,439 | B2 | * | 4/2004 | Mikhail et al. | 415/4.1 |
| 6,902,370 | B2 | * | 6/2005 | Dawson et al. | 415/4.1 |
| 2004/0170501 | A1 | * | 9/2004 | Seki | 416/223 R |
| 2007/0264121 | A1 | * | 11/2007 | Miller | 416/23 |
| 2008/0095608 | A1 | * | 4/2008 | Boatner | 415/4.2 |
| 2009/0196755 | A1 | * | 8/2009 | Peace et al. | 416/226 |

* cited by examiner

*Primary Examiner* — Igor Kershteyn
(74) *Attorney, Agent, or Firm* — Useful Arts IP

(57) ABSTRACT

A wind turbine blade is configured such that the lift force from the blade airfoil is always normal, or nearly normal, to the shaft torque. This condition maximizes energy conversion. This objective may be achieved by a) having the airfoil chord always aligned to the actual wind direction (subject only to small angle of attack variations), and b) slowing the turbine rotation rate so that no blade twist is needed. As a result, blade tip speed due to shaft rotation is less than the wind speed, and preferably much less. This low tip speed eliminates any hazard to birds. The lift force from the blade airfoil directly drives the torque on the shaft, so the control problem simplifies to adjusting the blade angle of attack to keep the lift constant across varying wind speeds.

17 Claims, 12 Drawing Sheets

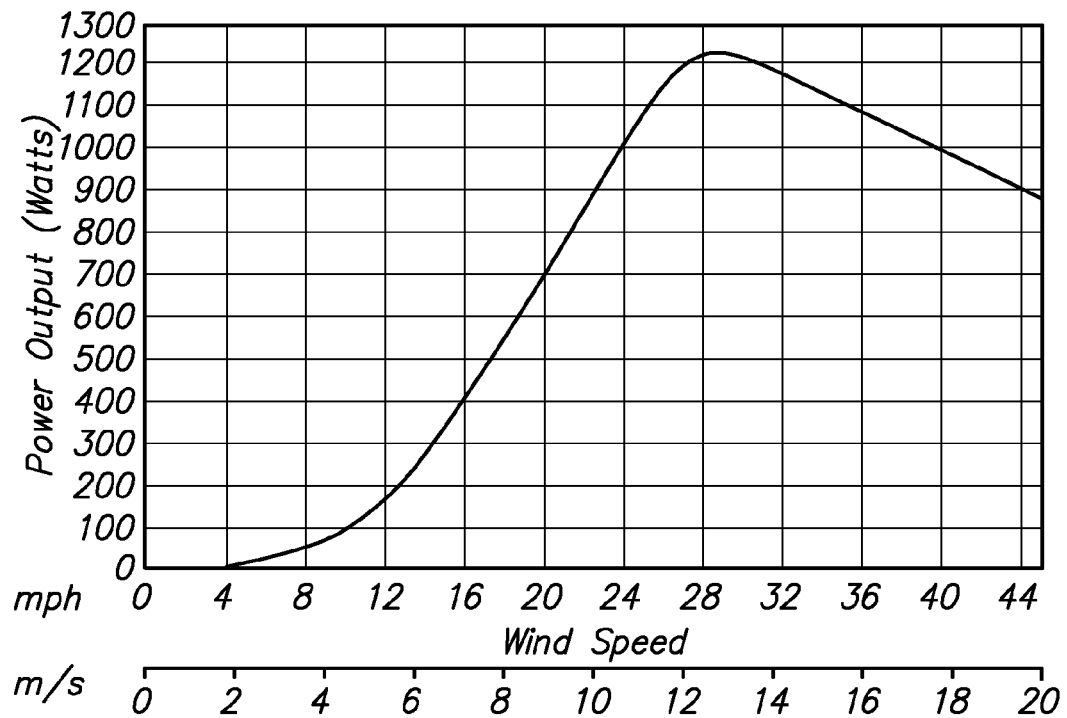
FIG. 1 Prior Art
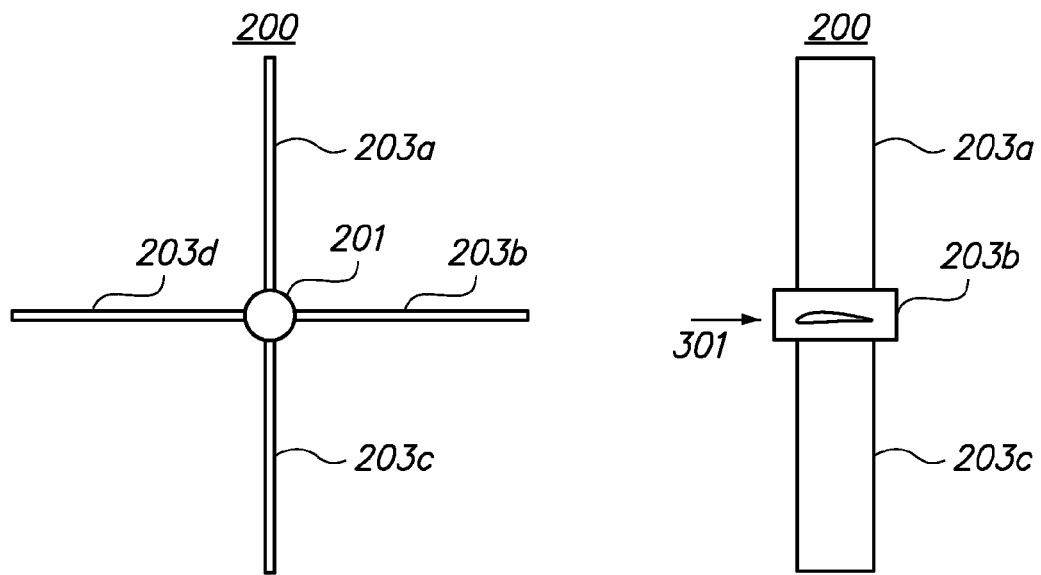
FIG. 2  FIG. 3

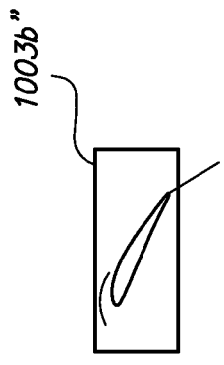
FIG. 10C
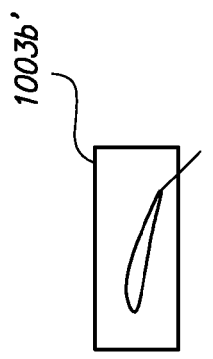
FIG. 10B
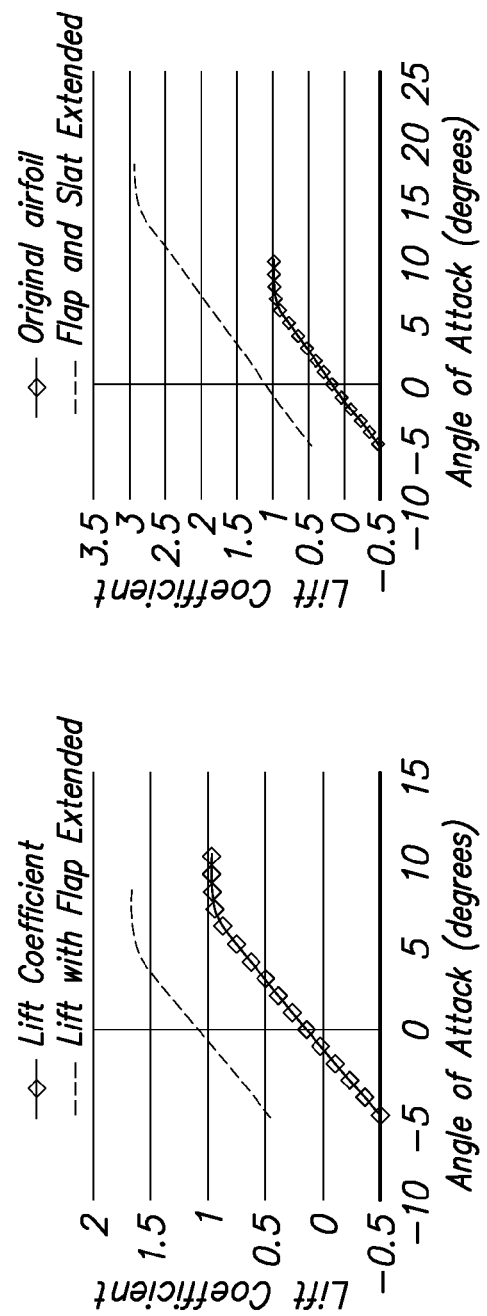
FIG. 12
FIG. 11
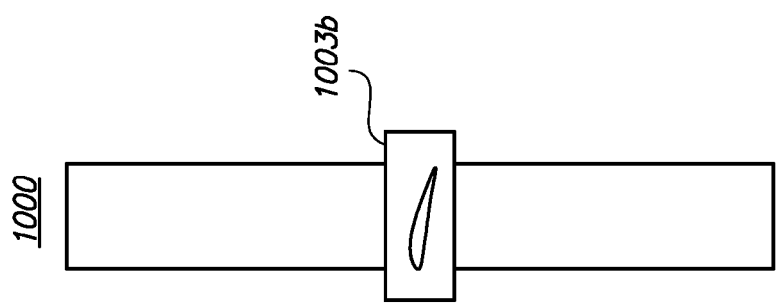
FIG. 10A

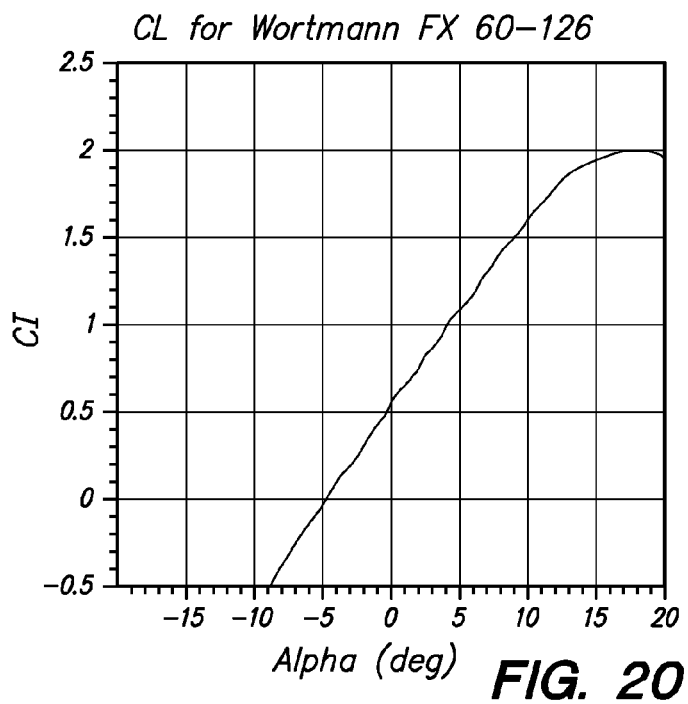
FIG. 19
FIG. 20
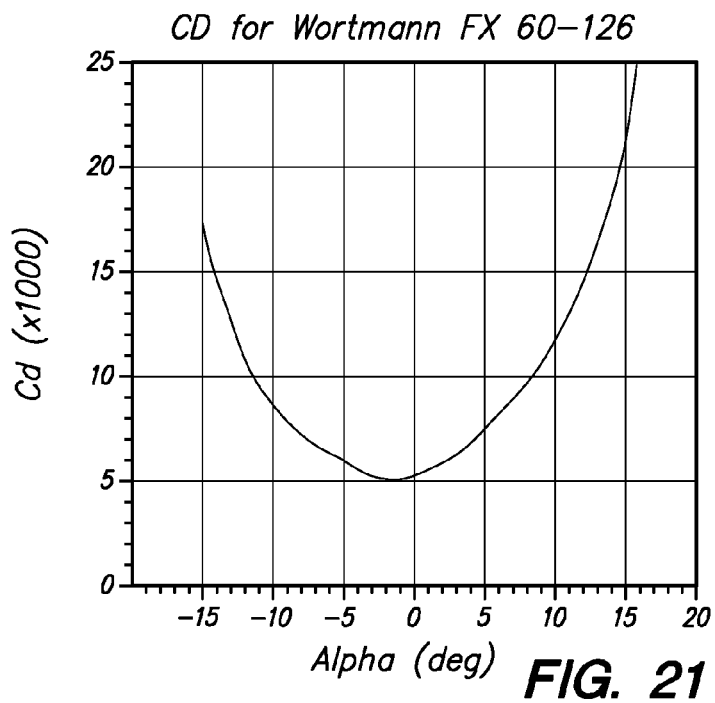
FIG. 21

WIND TURBINE HAVING FLOW-ALIGNED BLADES

RELATED APPLICATIONS

This application claims benefit of U.S. Application 61/391,198 titled WIND TURBINE DESIGN AND MANUFACTURE filed 7 Oct. 2010, incorporated herein by reference.

BACKGROUND

Existing wind turbine designs look very much like aircraft propellers. Underlying this resemblance is the apparent assumption that the wind turbine problem extracting energy from the wind—is the dual of the aircraft propulsion problem. Further to this assumption, existing wind turbines rotate fairly rapidly, with blade tip speeds around 200 miles per hour. Noise from the tip vortex is a necessary result. The fast moving rotor blades also pose a distinct hazard to birds and other flying creatures.

On closer examination, however, the assumptions underlying the foregoing design approach appear to be open to question. In particular, aircraft propellers are designed to convert torque from the engine into a forward-directed lift force. One byproduct of this process is "propeller wash," a mass transfer of air from ahead of the propeller to behind it. This transfer of air appears as a wind flowing in a direction opposite to the lift force to someone standing behind the propeller of a stationary airplane.

The dual relationship considers this problem in reverse: that air motion past a stationary propeller should produce a torque on the propeller shaft, and a lift force in a direction opposite to the wind direction. Conventional wind turbines demonstrate that this approach is workable. Whether it is optimal is a different question. The high tip speed requires the blade to be twisted (airfoil chord significantly misaligned to the wind direction) so that it is not physically aimed in the direction of the wind. In a conventional design, this arrangement results in there being a particular wind speed that is optimum for the desired energy conversion. Both lower and higher wind speeds have reduced energy conversion efficiencies as seen, for example, in FIG. 1. Wind speeds near the earth's surface are quite variable at any particular location. Furthermore, higher wind speeds cause higher turbine rotation rates, resulting in a safety hazard and necessitating complexity in turbine control design to address this hazard.

Considering the goal of converting the present wind (whatever speed that is) into torque that can be used to generate electricity, conventional arrangements leave something to be desired.

BRIEF DESCRIPTION OF THE DRAWING FIGURES

The present invention may be further understood from the following Detailed Description in conjunction with the appended drawing figures. In the drawing:

FIG. 1 is a plot of output power versus wind speed for a known wind turbine.

FIG. 2 is a front view of a rotor structure.

FIG. 3 is a side view of the rotor structure of FIG. 2.

FIG. 10A is a diagram of a rotor structure provided with low wind augmentation features.

FIG. 10B is a diagram of a blade of the rotor structure of FIG. 10A having a flap deployed.

FIG. 10C is a diagram of a blade of the rotor structure of FIG. 10B having both a flap and a slat deployed.

FIG. 11 is a plot of the lift coefficient for the blade of FIG. 10B showing a curve for a condition in which the flap is deployed as compared to a condition in which the flap is absent or not deployed.

FIG. 12 is a plot of the lift coefficient for the blade of FIG. 10C showing a curve for a condition in which the slat and the flap are deployed as compared to a condition in which the slat and the flap are absent or not deployed.

FIG. 19 is a profile of one example of another airfoil shape that may be used for the rotor blades described herein.

FIG. 20 is a plot of lift coefficient for the airfoil of FIG. 19.

FIG. 21 is a plot of drag coefficient for the airfoil of FIG. 19.

DETAILED DESCRIPTION

Summary

Figure 4:
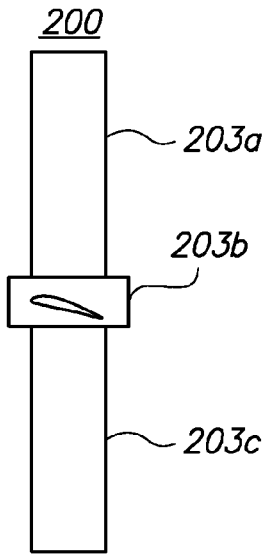
FIG. 4 is a diagram of the rotor structure of FIG. 2 under low wind conditions.

The present turbine rotor blade design satisfies the following objectives:

1. A turbine rotor (blades around a shaft) which can provide constant torque irrespective of the wind speed
2. Consistent energy conversion at all wind speeds, or operating fluid speeds
3. Slow rotation: No safety problem from fast turbine rotation
4. Low noise from blade vortex turbulence 5. Simplified control to lower cost One principal objective is to have the lift force from the blade airfoil always be normal to the shaft torque. This condition necessarily maximizes energy conversion. This objective may be achieved by a) having the airfoil chord always aligned to the actual wind (operating fluid) direction, subject only to small angle of attack variations, and b) slowing the turbine rotation rate so that no blade twist is needed. As a result, blade tip speed due to shaft rotation is less than the wind (operating fluid) speed, and preferably much less. That is, the tip speed ratio, defined as the ratio of tip speed to fluid speed, is less than one. Low tip speed eliminates any hazard to wildlife. The lift force from the blade airfoil directly drives the torque on the shaft, so the control problem simplifies to adjusting the blade angle of attack to keep the lift constant across varying wind speeds. For most airfoils, a slightly negative angle of attack results in zero lift, so this simple approach has a ready fail-safe condition. In the case of a wind turbine, this fail-safe condition is operable up to very high wind speeds, eliminating any need to provide for turbine overspeed control.

Preferably, the turbine blades use an airfoil shape optimized for low speed flight, enabling energy conversion at low wind (operating fluid) speeds. Known lift augmentation techniques of trailing edge flaps and leading edge slats can also be used if desired.

DESCRIPTION

In the present description, reference will most often be made to a wind turbine. The same teachings are equally applicable to water turbines and other types of turbines.

Referring now to FIGS. 2 and 3, a diagram is shown of a turbine rotor structure 200, such as a wind turbine rotor structure, that satisfies the foregoing objectives. In the illustrated embodiment, as seen in FIG. 2, four rotor blades 203a-203d are joined to a hub 201. As indicated schematically in FIG. 3, each of the blades, such as blade 203b, has a airfoil shape. During operation, the rotor structure is pointed into the wind 301, or more generally, the operating fluid. As a result, lift is aligned for maximum torque at the hub 201, and low drag is experienced at all wind speeds. The torque characteristics of the rotor structure 200 enable a faster start to be achieved from a standstill condition.

Figure 5:
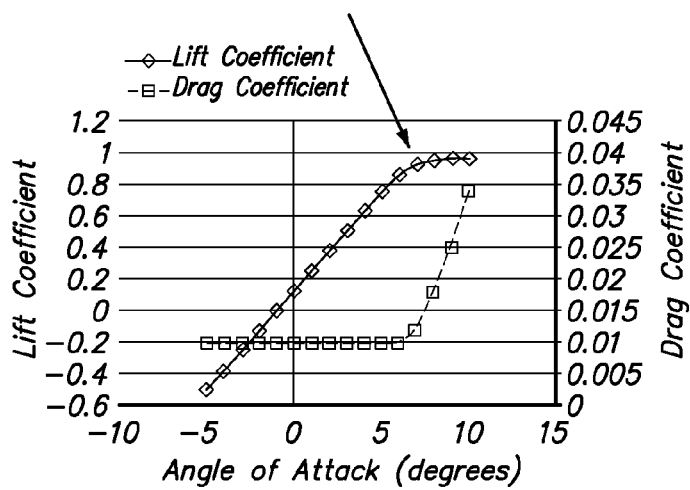
FIG. 5 is a plot of lift coefficient and drag coefficient for the rotor structure of FIG. 4, showing a possible operating point.

As illustrated in FIG. 4, a mechanism is provided for increasing the angle of attack (tilt) of each blade (e.g., blade 203b) under low wind conditions. This increased angle of attack produces an increased lift condition, at the cost of some increase in drag. As a result, torque is maximized under low wind conditions, still at low drag. The low drag results in low noise and low energy loss. A plot of lift coefficient and drag coefficient for the blade 203b in accordance with one embodiment is shown in FIG. 5. In low wind conditions, an operating point 501 is chosen that exhibits high lift as well as low (although increased) drag. Still, this drag is greatly reduced from prior art drag because this blade is aligned to the wind flow, without the large twists present in the state of the art.

Figure 6:
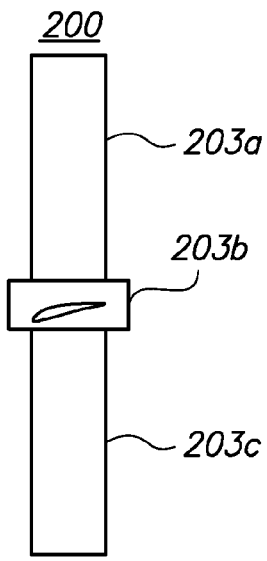
FIG. 6 is a diagram of the rotor structure of FIG. 2 under high wind conditions.
Figure 7:
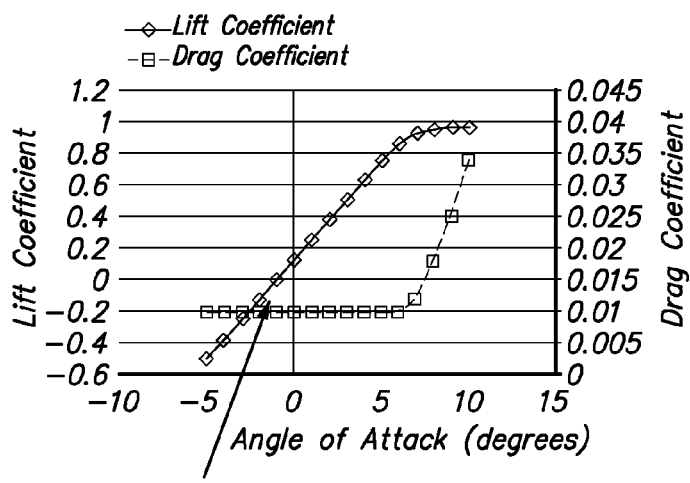
FIG. 7 is a plot of lift coefficient and drag coefficient for the rotor structure of FIG. 6, showing a possible operating point.

Referring to FIG. 6, the same mechanism enables the rotor blades to be pitched toward a negative angle of attack under high wind conditions. When the blade is set to a zero lift value, the rotor is "feathered," and all lift goes away, causing rotation to stop. This rest condition provides a fail-safe condition and enables blade lift to be reliably controlled even under very high wind conditions. The rotor will not overspeed (and rotation is already very slow anyway). Low drag minimizes stresses on the rotor. As shown in FIG. 7, in high wind conditions, an operating point 701 is chosen that exhibits low lift as well as low drag. Additionally, low rotation speed reduces gyroscopic effects, further reducing stresses on the rotor and increasing the ability of this rotor to quickly align to varying wind directions.

Figure 8:
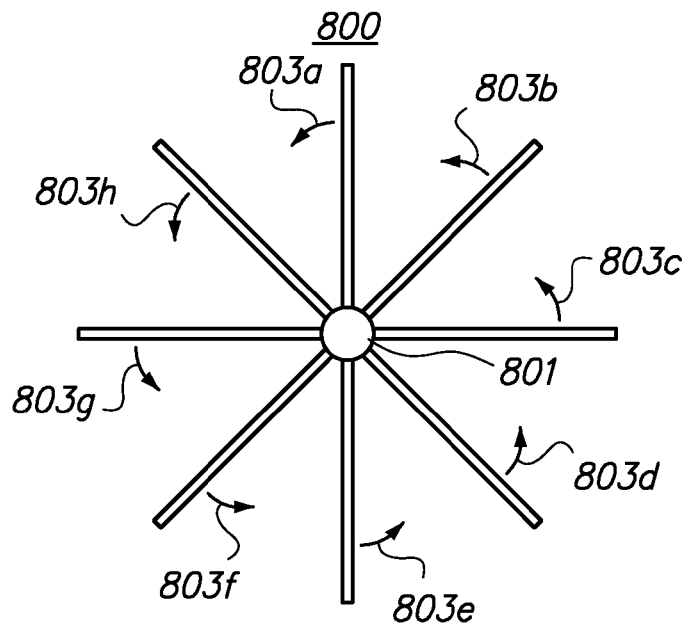
FIG. 8 is a front view of another rotor structure having an increased number of blades.

Referring to FIG. 8, a rotor structure 800 is shown that has an increased number of blades, eight in the present example, joined to a hub 801. An increased number of blades allows the rotor structure to interact with more wind. All lift force vectors 803a-803h align with the direction of rotation. Each blade presents a thin profile to the direction of the wind. The rotation rate is very slow, and the developed torque is very large.

Figure 9:
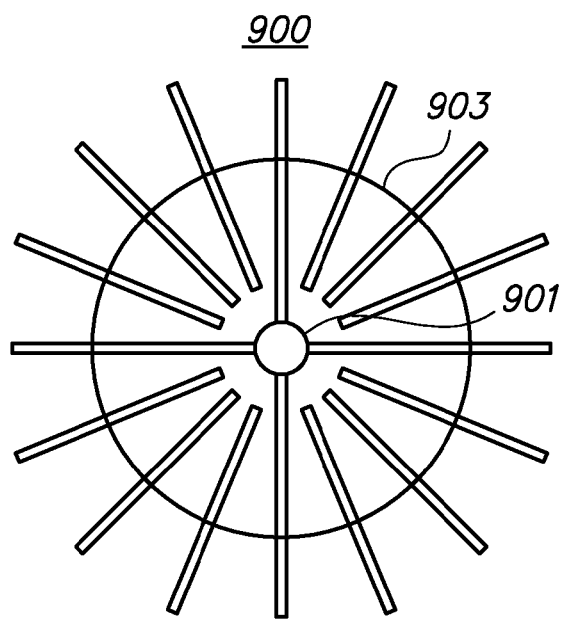
FIG. 9 is a front view of another rotor structure having a further increased number of blades.

In the example of FIG. 9, a rotor structure 900 is shown that provides even more blades while avoiding excessive congestion at the hub 901. A subset of the blades is joined to the hub 901. For the remaining blades, a member such as circular member 903, for example, may be provided that is attached to and supports all of the blades, or at least those blades that are not joined to the hub 901.

With the turbine blades aligned to the prevailing wind direction, the interaction area with the wind is identical to that of a conventional airfoil such as an aircraft wing. This interaction area is about three times the blade thickness on each side of the blade. In order to interact with all of the wind flowing through the area swept by the rotor, it is necessary to have a large number of blades on the rotor, as illustrated in FIG. 9. Each of these blades generates lift normal to the torque, so that the total torque is greatly increased. Adopting an airfoil shape which is optimized for generating lift at very low airspeeds therefore results in greatly improved energy conversion at low wind speeds.

For example, where a large number of rotor blades are each aligned to the prevailing wind and rotating below 10 rpm, in order to provide equivalent energy conversion to a conventional turbine design, the size of the rotor can be reduced. A double benefit is therefore obtained: improved energy conversion at low wind speed, and a smaller rotor size for the same energy conversion. This combination enables wind conversion to be practically used in areas where conventional turbine designs would be impractical.

Referring to FIG. 10A, a diagram is shown of a rotor structure 1000 provided with low wind augmentation features. Such features may include flaps, slats, or other airfoil control surfaces. The effect of flaps may be seen in FIG. 10B and FIG. 11. A lift coefficient curve is shifted upward, resulting in greater lift for a given wind speed. The combined effect of flaps and slats may be seen in FIG. 10C and FIG. 12. The lift coefficient curve is shifted upward due to the action of the flaps and is extended prior to flattening out, due to the action of the slats. Under low wind conditions therefore, besides increasing the angle of attack (tilt) for each blade, flaps may be extended to further increase lift for each blade. Deploying slats on the leading edge of each blade enables even more lift to be achieved as the angle of attack may be increased further than without the use of slats.

Figure 13:
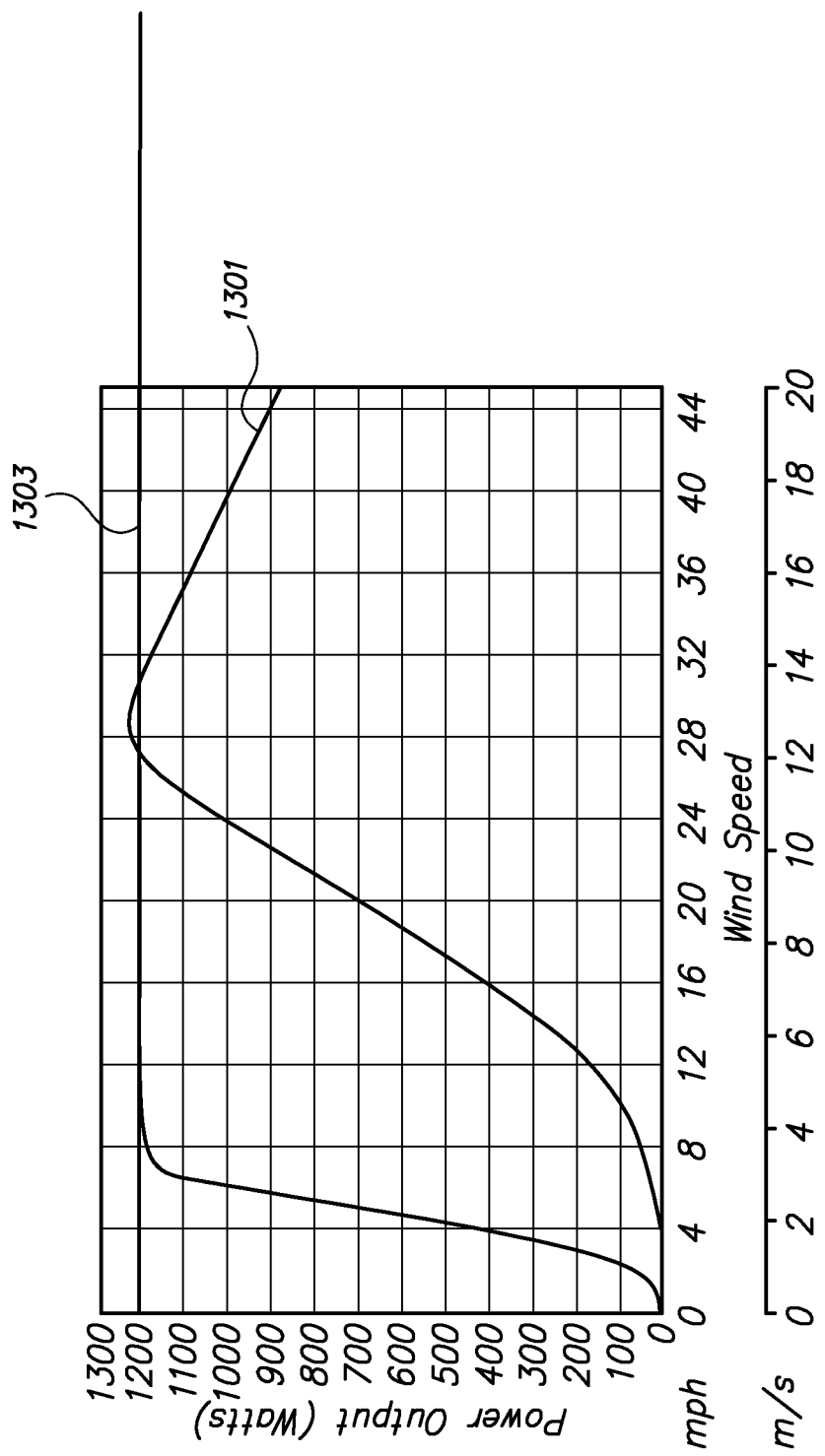
FIG. 13 is a plot of power output versus wind speed for rotor structures described herein as compared to conventional rotor structures.

FIG. 13 shows a plot of power output versus wind speed for rotor structures described herein (1301') as compared to conventional rotor structures (1300). Notice that power output is significantly greater at low wind speeds using the described rotor structures. Notice further that maximum power output may be sustained at high wind speeds using the described rotor structures, whereas using conventional rotor structures, power output drops off at high wind speeds in accordance with required safety features. Hence, the described rotor structures are able to achieve fast start and to generate useful power in less wind. The described rotor structures also enable consistent performance across a wide range of wind speeds.

Figure 14:
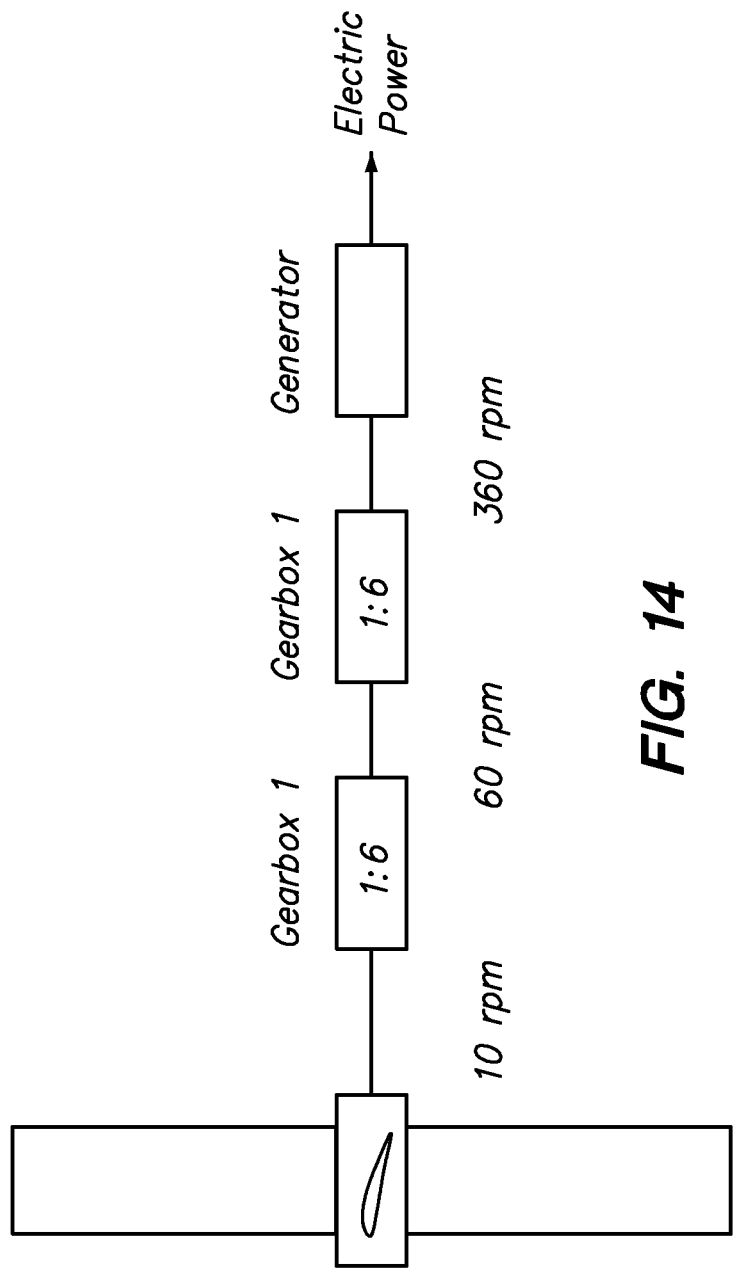
FIG. 14 is a diagram of a wind turbine provided with gearing to match a low-RPM rotor structure to a high-RPM generator.

Conventional electrical generators (torque to electricity converters) are designed to function best at high rotation rates, typically around 1500 rpm or so. Newer generator devices are becoming available that function at reduced rotation rates such as 350 rpm. In the case of the rotor structures described, the rotation rate is typically well below 10 rpm. In the absence of a different generator design there may be a need for significant gearing ratios. In one example, shown in FIG. 14, two stages of 6:1 are used. This gearing may be expected to decrease efficiency.

As previously described, since the lift force from the blade airfoil directly drives the torque on the shaft, the control problem simplifies to adjusting the blade angle of attack to keep the lift constant across varying wind speeds. For most airfoils, a slightly negative angle of attack results in zero lift, so this simple approach has a ready fail-safe condition. In the case of a wind turbine, this fail-safe condition is operable up to very high wind speeds, eliminating any need to provide for turbine overspeed control. This reduces costs while also improving safety and reliability.

Figure 15:
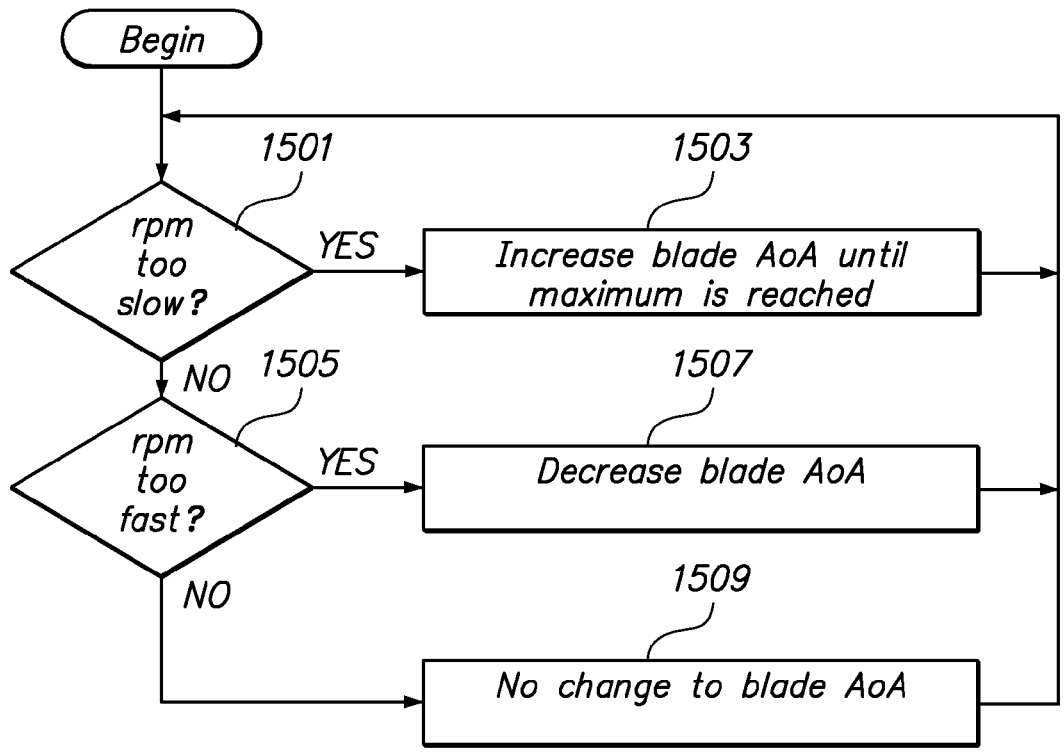
FIG. 15 is a flow diagram of a basic control algorithm that may be used to control rotor structures described herein.

A basic control algorithm is illustrated in FIG. 15. If the rotor structure RPM is slower than desired (1501), then blade angle of attack (AoA) is increased (1503) subject to a maximum value. If RPM is faster than desired (1505), then AoA is decreased (1507). If RPM is neither too slow nor too fast, then no change is made to AoA (1509).

Figure 16:
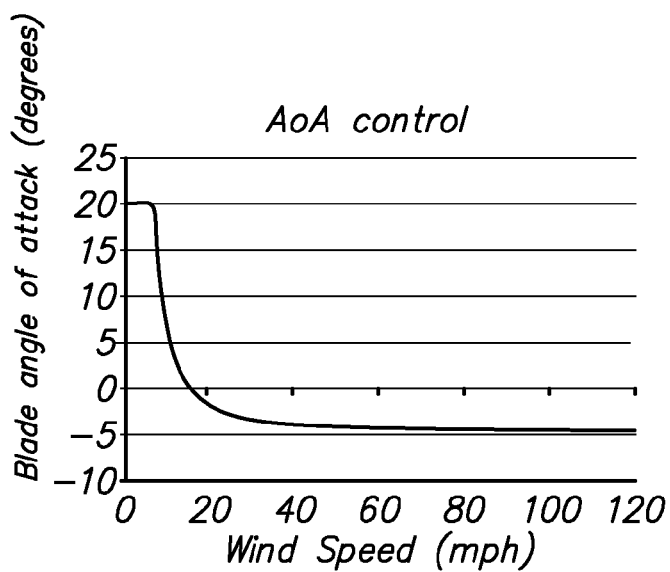
FIG. 16 is a plot illustrating angle of attack versus wind speed in accordance with the control algorithm of FIG. 15.

One example of how AoA may be controlled is illustrated in FIG. 16. At low wind speeds, a maximum AoA is maintained for maximum lift. As wind speed increases, AoA is decreased. As wind speed continues to increase, AoA passes through zero and becomes negative, yet still producing the necessary lift force to maintain the desired torque. At a sufficiently negative AoA we encounter a zero lift condition. In this condition, rotation of the rotor structure stops. In general, AoA is adjusted to keep lift force constant as wind speed (or fluid speed) varies.

Figure 17:
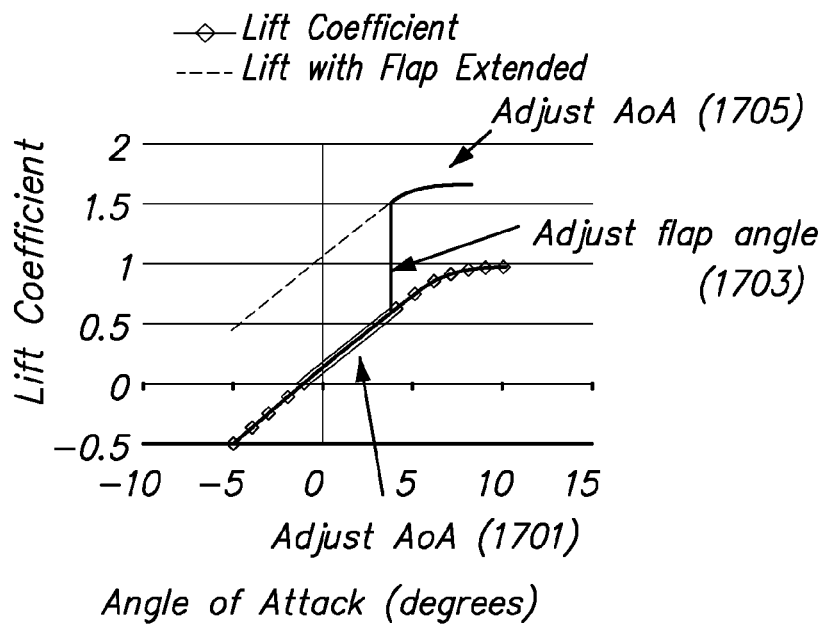
FIG. 17 is a diagram: illustrating angle of attack adjustment in coordination with the deployment of flaps.

Augmented lift techniques may add additional steps to the foregoing control algorithm. As illustrated in FIG. 17, if flaps alone are used to augment lift, then prior to an adjustment of flap angle, as AoA is adjusted, lift is varied in accordance with a first lift coefficient curve (1701). When additional lift is needed, the flap angle is adjusted (1703). Then, as AoA is adjusted, lift is varied in accordance with a second lift coefficient curve (1705).

Figure 18:
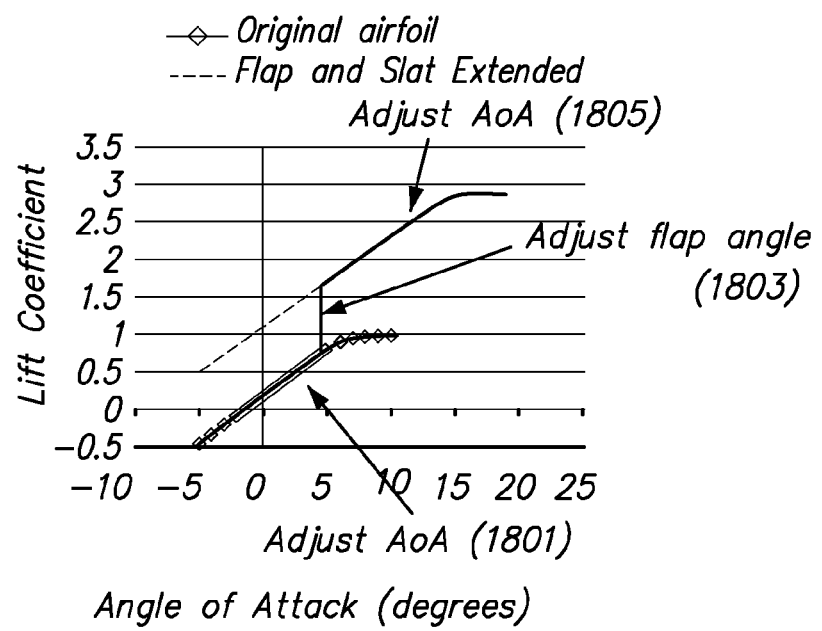
FIG. 18 is a diagram illustrating angle of attack adjustment in coordination with the deployment of flaps.

As illustrated in FIG. 18, if both flaps and slats are used to augment lift, then prior to an adjustment of flaps and slats, as AoA is adjusted, lift is varied in accordance with a first lift coefficient curve (1801). When additional lift is needed, the flaps and slats are adjusted (1803). Then, as AoA is adjusted, lift is varied (within an extended range due to the action of the slats) in accordance with a second lift coefficient curve (1805).

Figure 22:
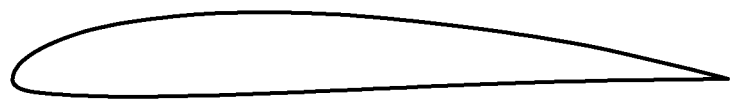
FIG. 22 is a profile of an example of another airfoil shape that may be used for the rotor blades described herein.

The foregoing rotor blades may use any of various suitable existing airfoil designs. The profile of one such airfoil (the Wortmann FX 60-126 airfoil) is shown in FIG. 19. Corresponding lift coefficient and drag coefficient curves are shown in FIG. 20 and FIG. 21, respectively. An example of an alternative suitable airfoil shape is shown in FIG. 22. Airfoil selection criteria include such factors as the lift-to-drag ratio, and having a high lift coefficient for operation at low wind speeds.

Figure 24:
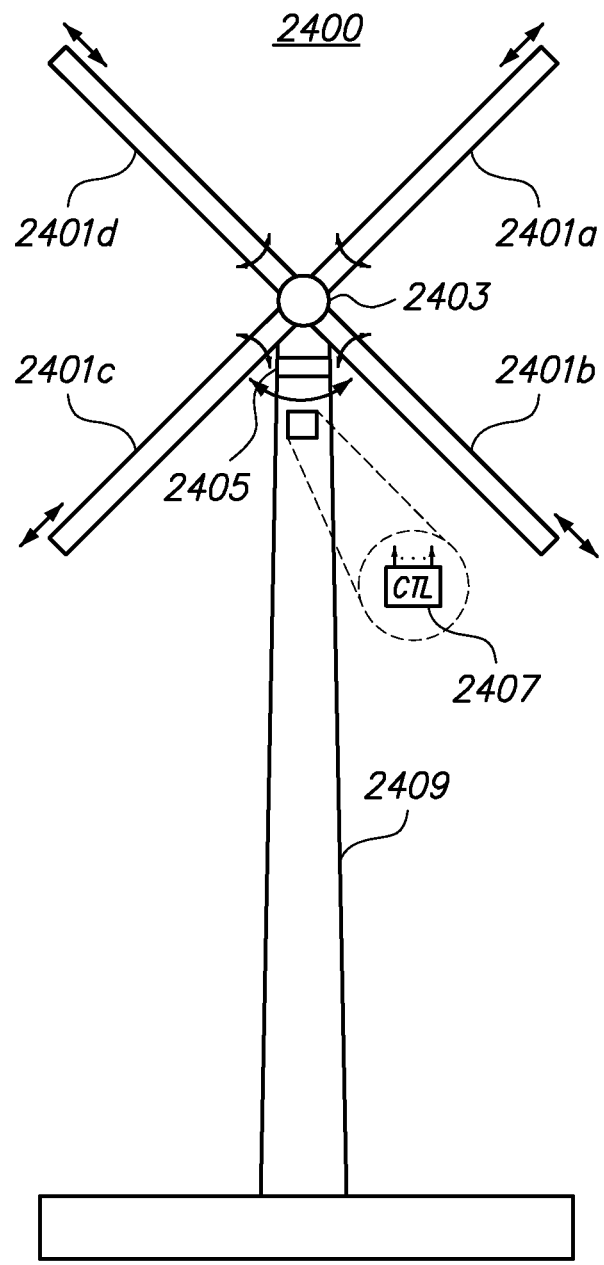
FIG. 24 is a diagram of a wind turbine illustrating control aspects thereof.

Referring to FIG. 24, a wind turbine 2400 is shown that incorporates various features as previously described. Rotor blades 2401*a*, 2401*b*, 2401*c* and 2401*d* of a rotor structure having a hub 2403 are configured to enable an alignment condition. For each of the rotor blades, and along a majority of a length of each of the rotor blades, a rotor blade chord is aligned predominantly with a direction of fluid flow. An alignment mechanism 2405 is coupled to the rotor structure for achieving the alignment condition. A controller 2407 is coupled to the rotor structure for controlling the alignment mechanism 2405 to achieve the alignment condition, as indicated by the arc underneath the alignment mechanism 2405. The controller 2407 is also configured to control at least one of rotation speed and torque. In an exemplary embodiment, the controller 2407 is configured to control rotation speed such that a tip speed ratio of each of the rotor blades is less than one.

A mechanism may be provided for adjusting an angle of attack (tilt) of each of the rotor blades, as indicated by the arcs corresponding to each of the rotor blades. The controller 2407 may be configured to control rotation speed of the rotor structure by controlling the angle of attack of the rotor blades. Alternatively, a passive mechanism may be used to automatically adjust an angle of attack of each of the rotor blades as a function of fluid speed.

Optionally, each of the rotor blades may have a telescoping structure and a length control mechanism, with the controller 2407 being configured to control rotation speed of the rotor structure by controlling lengths of the rotor blades (as indicated by the bi-directional arrows at the ends of each of the rotor blades). Moreover, the controller 2407 may be configured to control rotation speed of the rotor structure by, at times, controlling both the angle of attack of the rotor blades and controlling lengths of the rotor blades.

Some or all of the rotor blades may be provided with one or more control surfaces (shown for example in FIGS. 10B and 10C) such as a trailing edge flap for increasing torque at low fluid speeds; a leading edge slat for increasing torque at low fluid speeds, etc. The controller 2407 may be configured to control the positions of such control surfaces. A mounting tower 2409 for supporting the rotor assembly may be engineered in accordance with reduced strength requirements resulting from the alignment condition and its reduced drag characteristic.

Figure 23A:
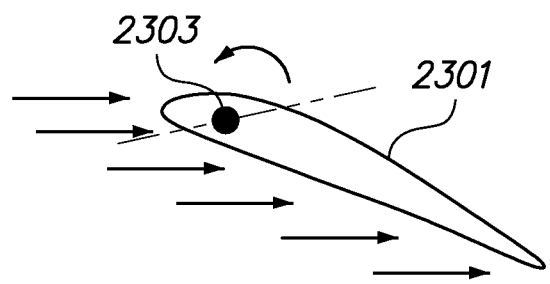
FIG. 23A is a diagram illustrating airfoil characteristics that may be used in a passive mechanism for controlling blade angle of attack and resulting rotation speed.
Figure 23B:
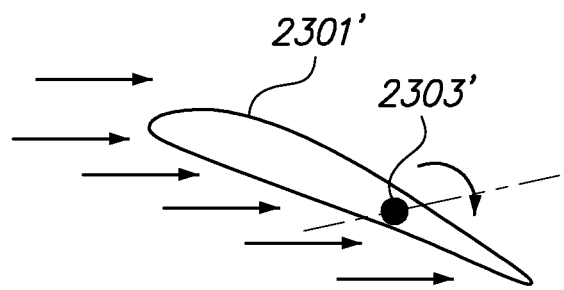
FIG. 23B is a diagram illustrating an opposite characteristic as compared to FIG. 23A.

An airfoil in a flow has additional forces acting on it besides lift and drag. Depending on where its connection point is, and the angle of attack, there is also a torque centered on the connection point acting to either increase or decrease the angle of attack. In FIG. 23A, the connection point is very forward on the chord (e.g. toward the leading edge of the airfoil). Most of the flow presses on the airfoil behind the connection point, resulting in a torque trying to reduce the angle of attack, called a pitch down effect. Alternatively, FIG. 23B shows the same airfoil in the same flow but at a connection point more rearward on the chord. Here the flow presses more on the forward part of the airfoil, resulting in a torque trying to increase the angle of attack. Together, the pitch down effect and the pitch up effect are called the 'pitching moment'.

Figure 25A:
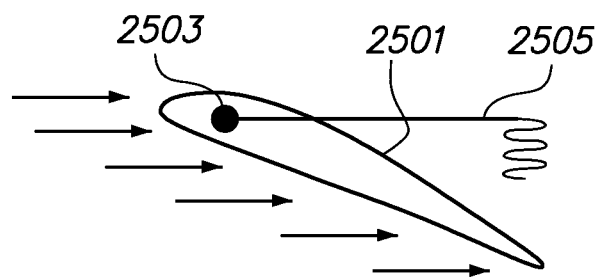
FIG. 25A is a diagram of a passive mechanism for controlling blade angle of attack and resulting rotation speed under lower-speed wind conditions.
Figure 25B:
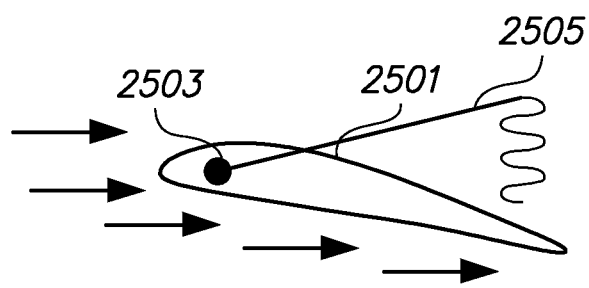
FIG. 25B is a diagram like that of FIG. 25A under higher-speed wind conditions.

In the pitch down effect (where the moving air pushes harder on the rear than the front of the airfoil when the mounting point is toward the front of the blade), as the wind speed increases, it tries to push the blade toward a smaller angle of attack. This is exactly the tendency needed in controlling the rotor. Referring to FIG. 25A, an airfoil 2501 is provided having a mounting point 2503 toward the front of the blade. A spring 2505 biases the airfoil about the mounting point. As shown in FIG. 25B, with increased wind speed, the pitch down effect pushes the blade toward a smaller angle of attack. The pitch down effect is managed by selecting the spring to counter this natural pitching moment properly so that the resulting reduced angle of attack is the desired value.

It will be apparent to those of ordinary skill in the art that the present invention can be embodied in other specific forms without departing from the spirit or essential character thereof. The foregoing description is therefore to be regarded as illustrative, not restrictive. The scope of the invention is defined by the appended claims, not the foregoing description, and all changes which some within the range of scope of equivalents thereof are intended to be embraced therein.

What is claimed is:

1. Apparatus for generating power from a moving fluid, comprising:
    a rotor structure comprising a plurality of rotor blades, the rotor blades being configured to enable an alignment condition such that for each of the plurality of rotor blades, and along a majority of a length of each of the plurality of rotor blades, a rotor blade chord is aligned predominantly with a direction of fluid flow;
    a coupling structure that couples the rotor structure to a shaft forming a horizontal axis of rotation; and
    a controller coupled to the rotor structure for controlling at least one of rotation speed and torque of the rotor structure, wherein the controller is configured to, during a power generation condition, control rotation speed such that a tip speed ratio of each of said plurality of rotor blades is less than one.

2. The apparatus of claim 1, comprising an alignment mechanism coupled to the rotor structure for achieving the alignment condition.

3. The apparatus of claim 1, comprising a mechanism for adjusting an angle of attack of each of the plurality of rotor blades, wherein the controller is configured to control rotation speed of the rotor structure by controlling the angle of attack of said plurality of rotor blades.

4. The apparatus of claim 1, comprising a passive mechanism for automatically adjusting an angle of attack of each of the plurality of rotor blades as a function of fluid speed.

5. The apparatus of claim 1, wherein each of the plurality of rotor blades has a telescoping structure and a length control mechanism, wherein the controller is configured to control rotation speed of the rotor structure by controlling lengths of said plurality of rotor blades.

6. The apparatus of claim 1, wherein each of the plurality of rotor blades has a telescoping structure and a length control mechanism, further comprising:
    a mechanism for adjusting an angle of attack of each of the plurality of rotor blades;
    wherein the controller is configured to control rotation speed of the rotor structure by, at times, controlling both the angle of attack of said plurality of rotor blades and controlling lengths of said plurality of rotor blades.

7. The apparatus of claim 1, wherein at least some of the plurality of rotor blades comprise a control surface selected from: a trailing edge flap for increasing torque at low fluid speeds; and a leading edge slat for increasing torque at low fluid speeds.

8. The apparatus of claim 7, wherein at least some of the plurality of rotor blades comprise multiple control surfaces comprising both a trailing edge flap for increasing torque at low fluid speeds and a leading edge slat for increasing torque at low fluid speeds.

9. The apparatus of claim 1, comprising:
    a generator; and
    means for matching a rotation rate of the rotor structure and a rated input shaft rotation rate of the generator.

10. The apparatus of claim 1, comprising a mounting tower for supporting the rotor assembly, wherein the mounting tower is engineered in accordance with reduced strength requirements resulting from said alignment condition.

11. A method of controlling an apparatus for generating power from a moving fluid, the apparatus comprising a rotor structure comprising a plurality of airfoil-shaped rotor blades each having a length and being configured to enable it to have a substantially constant angle of attack along a majority of the length thereof, the method comprising:
    monitoring rotation of the rotor structure; and
    during a power generating condition, controlling rotation speed of the rotor structure about a horizontal axis of rotation by controlling an angle of attack of said plurality of rotor blades, such that a tip speed ratio of each of said plurality of rotor blades is less than one.

12. The method of claim 11, comprising, at low fluid speeds, actuating control surfaces provided on at least some of the rotor blades so as to increase torque.

13. The method of claim 12, wherein the control surfaces comprise flaps.

14. The method of claim 12, wherein the control surfaces comprise slats.

15. The method of claim 12, wherein the control surfaces comprise both flaps and slats.

16. The method of claim 11, comprising, at high fluid speeds, decreasing an angle of attack of at least some of the rotor blades.

17. The method of claim 11, comprising, at excessive fluid speeds, controlling an angle of attack of at least some of the rotor blades to be near zero or negative.

* * * * *